United States Patent [19]
Bilgery

[11] Patent Number: 5,570,870
[45] Date of Patent: Nov. 5, 1996

[54] AIR FLOW METER WITH SLIDE VALVE FOR MILKING MACHINES

[75] Inventor: Erwin Bilgery, Romanshorn, Switzerland

[73] Assignee: Westfalia Separator AG, Oelde, Germany

[21] Appl. No.: 240,686

[22] PCT Filed: Oct. 29, 1992

[86] PCT No.: PCT/EP92/02467

§ 371 Date: Oct. 6, 1994

§ 102(e) Date: Oct. 6, 1994

[87] PCT Pub. No.: WO93/10421

PCT Pub. Date: May 27, 1993

[30] Foreign Application Priority Data

Nov. 16, 1991 [DE] Germany .......................... 41 37 811.3

[51] Int. Cl.⁶ ..................................................... F16K 5/10
[52] U.S. Cl. ........................... 251/208; 251/325; 137/553
[58] Field of Search ..................................... 251/205, 208, 251/209, 325, 310; 137/553; 73/253

[56] References Cited

U.S. PATENT DOCUMENTS 3,557,821  1/1971  Siegel et al. ..................... 251/208 X
3,612,102  10/1971  Hulsey ............................. 251/209 X Primary Examiner—Kevin Lee
Attorney, Agent, or Firm—Sprung Horn Kramer & Woods

[57] ABSTRACT

An air-flow meter for milking machines, comprising an enclosed housing with a connection to a line that is to be tested for flow and pressure and with an air-intake mechanism with a variable cross-section. The air-intake mechanism is an air intake with a slot-shaped cross-section. A rotating cylinder is accommodated inside the housing and operates in conjunction with the slotted intake. The cylinder has a breach that tapers out along a considerable length of its circumference. The longitudinal axis of the intake parallels the axis the cylinder rotates around, the free cross-section of the intake is only a fraction of length of the breach along the circumference of the cylinder, and any area of the breach can be aligned with the air intake by rotating the cylinder.

7 Claims, 2 Drawing Sheets

AIR FLOW METER WITH SLIDE VALVE FOR MILKING MACHINES

BACKGROUND OF THE INVENTION

The invention concerns an air-flow meter for milking machines. The meter comprises an enclosed housing with a connection to a line that is to be tested for flow and pressure. The housing has an air-intake mechanism with a variable cross-section.

A milk-flow meter of this type is known from German OS 1 757 838. It measures the output of a vacuum pump, a component of the machine, subject to various operating conditions. These measures must be repeated at various intervals, and their results must comply with domestic regulations in various countries.

The air-intake mechanism in the known meter consists of calibrated bores and of rotating disks that block them off. Since the disks are subject to considerable pressure, they are difficult to rotate. Furthermore, only discontinuous adjustments can be carried out, and no interpolations are possible. Finally, the bores can clog up and contaminate the results.

SUMMARY OF THE INVENTION

The object of the present invention is accordingly an air-flow meter for milking machines wherein the flow of air can be adjusted easily and continuously.

This object is attained in accordance with the present invention in a milking machine of the aforesaid type by the characteristics now described. The air-intake mechanism is an air intake with a slot-shaped cross-section. A rotating slide valve is accommodated inside the housing and operates in conjunction with the slotted intake. The slide valve has an opening that tapers out as it extends along its circumference. The longitudinal axis of the intake parallels the axis the slide valve rotates around. The free cross-section of the intake is only a fraction of the length of the opening along the circumference of the slide valve. Any area of the opening can be aligned with the air intake by rotating the slide valve.

Since there is little friction between the rotating slide valve and the air intake, the amount of air flowing through the machine can be precisely and rapidly adjusted. The tapering opening makes it possible to continuously vary the width of the port by rotating the slide valve. Since the air-intake mechanism will not clog up, the results will not be contaminated.

The air intake in one practical embodiment of the invention is positioned radially movable with respect to the housing. The slot is accordingly positioned free of clearance in relation to the rotating slide valve.

The seal is created between the air intake and the rotating slide valve in one embodiment because springs force the intake toward the slide valve. This system also maintains the surface of the slide valve clean.

The rotating slide valve in another advantageous embodiment is coupled to a transmission. This design enables even more precise and easier adjustment.

The transmission in another advantageous embodiment is coupled to a motor. The procedure can be automated by providing the motor with controls. Since the meter is so easy to adjust, the motor can be small and use little electricity. This feature is a particular advantage because it is usually difficult to supply electricity to the site from outside, and the motor must be battery-powered. The battery can be accommodated in the meter's controls for example. The controls can be integrated into the housing along with the battery compartment.

An angular position sensor can be associated with the rotating slide valve and another with the motor.

One embodiment of the invention will now be specified with reference to the drawing, wherein

DETAILED DESCRIPTION OF THE INVENTION

Figure 1:
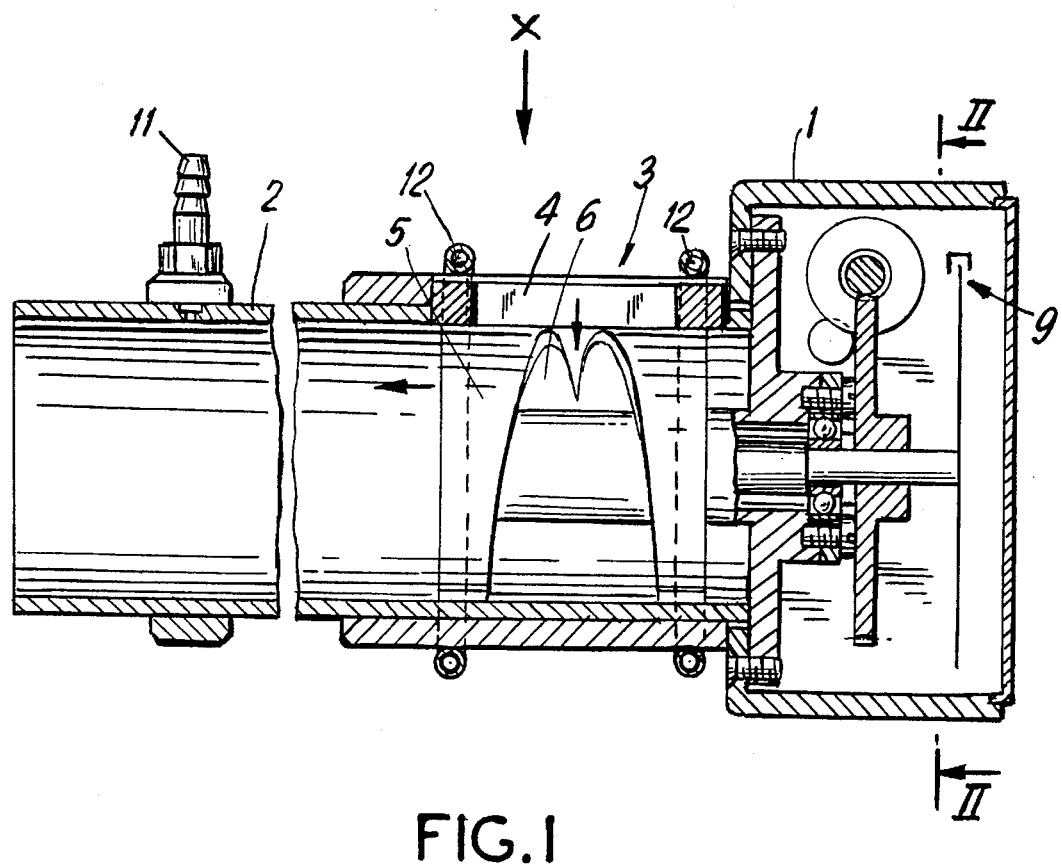
FIG. 1 is a section through the air-flow meter.
Figure 2:
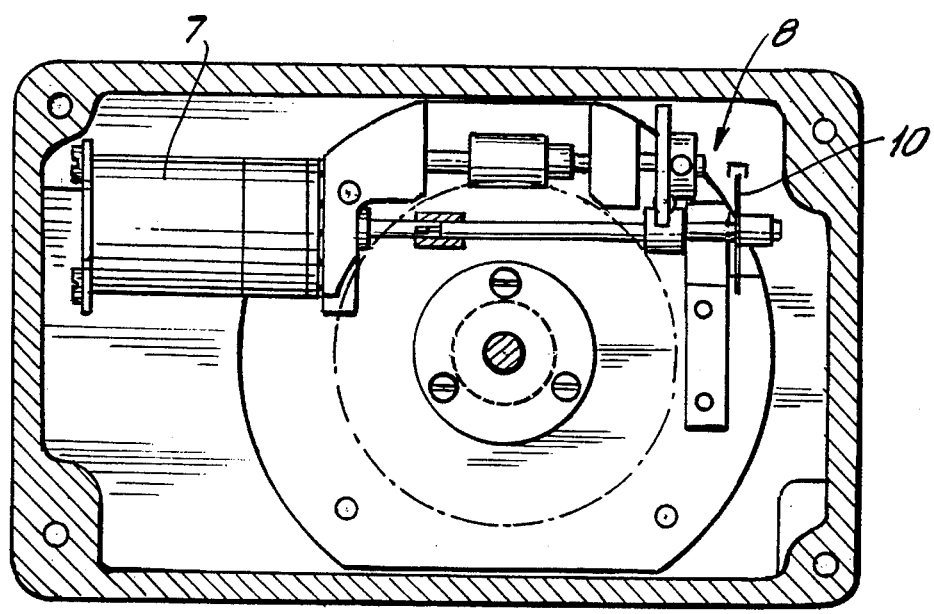
FIG. 2 is a section along the line II—II in FIG. 1.

The housing 1 illustrated in FIG. 1 has a line connection 2 and an air-intake mechanism 3. Air-intake mechanism 3 comprises an air intake 4 on the outside of housing 1 and a rotating slide valve 5 accommodated in the housing and associated with the intake. The circumference of the slide valve is interrupted by an opening 6. Opening 6 tapers out as it extends along the circumference of the slide valve. Any area of the opening can be aligned with air intake 4 by rotating slide valve 5. Springs 12 can force the intake toward the slide valve. Slide valve 5 can, as will be evident from FIG. 2, be rotated by a motor 7 by way of a transmission 8. A sensor 9 communicates the instant angle of rotation of slide valve 5 to unillustrated controls. The controls accommodate a battery that powers motor 7. Associated with motor 7 is another angular position sensor 10 that mediates fine adjustment of slide valve 5. Associated with line connection 2 is a sampling connection 11. An unillustrated vacuum gauge communicates with sampling connection 11 and transmits pressure data to the controls.

Figure 3:
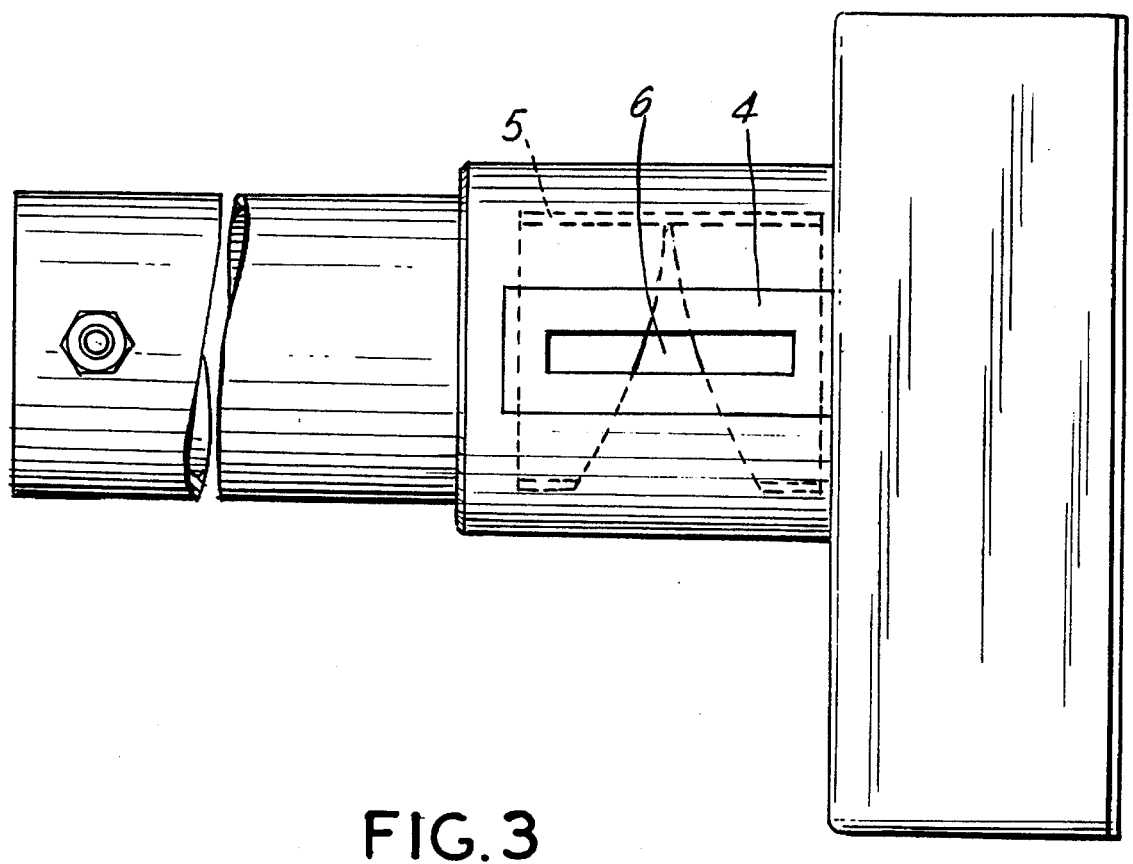
FIG. 3 is a view of the area X in FIG. 1.

As will be evident from FIG. 3, the free cross-section of air intake 4 along the circumference of rotating slide valve 5 is only a fraction of the length of opening 6. Slide valve 5 can accordingly be rotated to various angles to align any area of opening 6 with air intake 4. The continuous taper of opening 6 along so much of the circumference of slide valve 5 allows very fine adjustment of the flow of air.

Associated with each instantaneous angle of rotating slide valve 5 is a specific level of air flow and difference in pressure. The associated data are entered in the controls. The level of the vacuum at sampling connection 11 is also processed in the controls, and slide valve 5 rotated to establish a prescribed level. A program for the entire measurement sequence is stored in the controls, and the procedure can be entirely automatic. The results can be displayed and filed. Since there is no human intervention, the results will be free of any errors deriving from manual control.

I claim:

1. An air-flow meter for milking machines, comprising a housing with a connection to a line to be tested for flow and pressure of the line and air-intake means comprising an air intake with a slot-shaped cross-section, a rotatable cylindrical slide valve disposed inside the housing and rotatable about an axis, wherein the slide valve has a gradually enlarging opening extending along a length of its circumference, wherein a longitudinal axis of the intake is parallel to the axis of rotation of the slide valve, and wherein the slide valve is movable relative to the intake to position any portion of the opening in alignment with the intake to define an effective free cross-section of the intake which varies from a minimum to a maximum portion thereof.

2. The air-flow meter as in claim 1, wherein the air intake is radially movable relative to the housing.

3. The air-flow meter as in claim 2, further comprising springs for biasing the intake toward the slide valve.

4. The air-flow meter as in claim 1, further comprising a transmission coupled to the slide valve.

5. The air-flow meter as in claim 4, further comprising a drive motor coupled to the transmission.

6. The air-flow meter as in claim 1, further comprising a first angular position sensor associated with the slide valve.

7. The air-flow meter as in claim 6, further comprising a second angular position sensor associated with the motor.

* * * * *